Jan. 17, 1956　　　S. B. THOMAS　　　2,730,855
DEVICE FOR RECOVERING COTTON
Filed June 28, 1951　　　3 Sheets-Sheet 1

Sid B. Thomas
INVENTOR.

BY
Attorneys

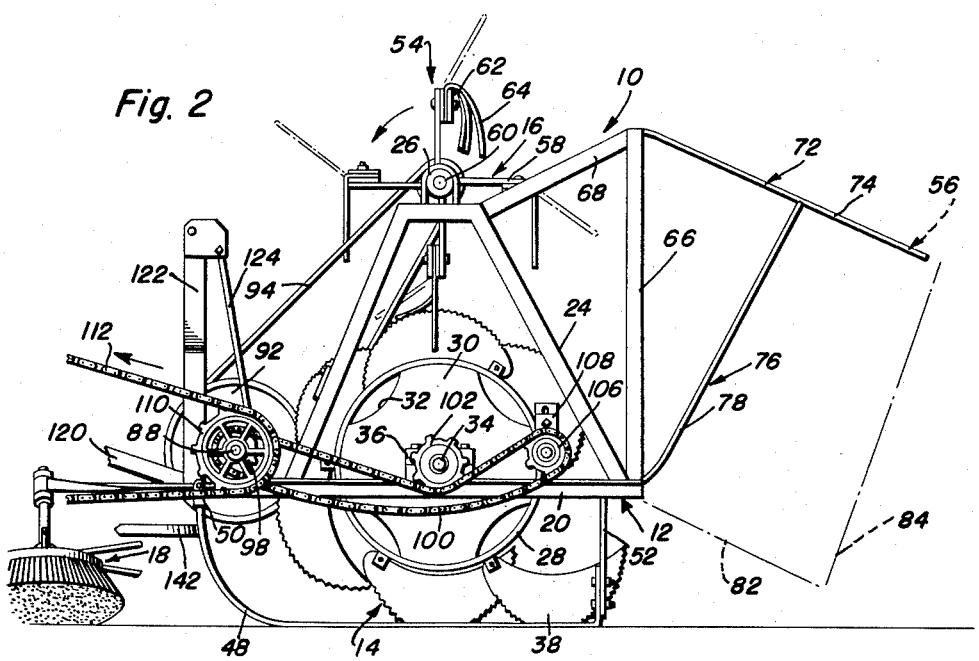

Jan. 17, 1956     S. B. THOMAS     2,730,855
DEVICE FOR RECOVERING COTTON
Filed June 28, 1951     3 Sheets-Sheet 3
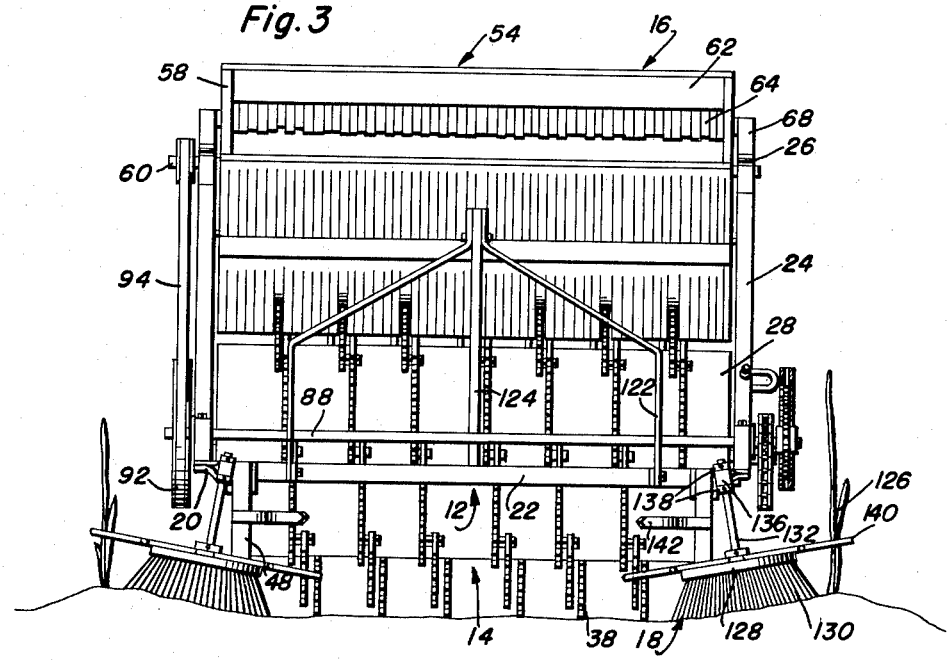
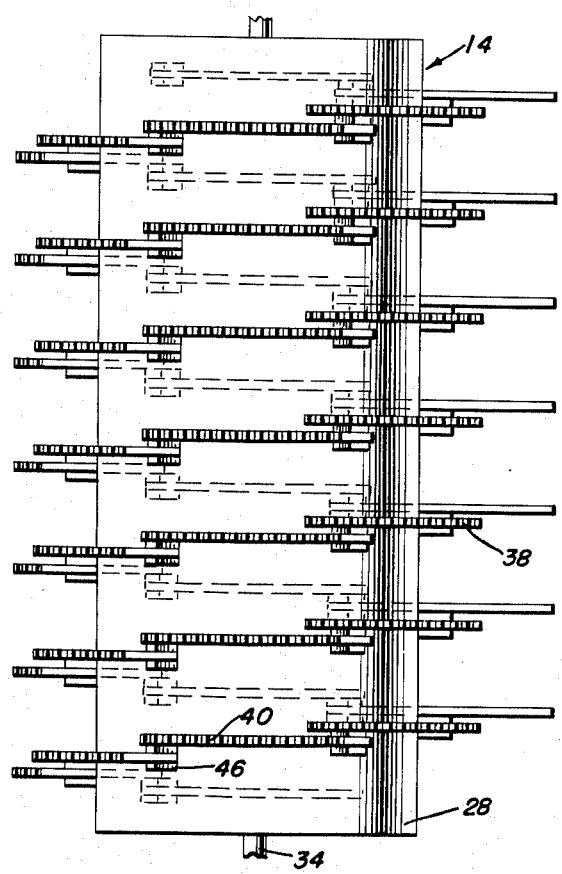
Sid B. Thomas
INVENTOR.

United States Patent Office 2,730,855
Patented Jan. 17, 1956

2,730,855

DEVICE FOR RECOVERING COTTON

Sid B. Thomas, Lockney, Tex.

Application June 28, 1951, Serial No. 233,986

6 Claims. (Cl. 56—28)

This invention comprises novel and useful improvements in harvesting devices, and more particularly pertains to a device for picking up and gathering loose cotton off the ground.

An important object of this invention is to provide a device for picking loose cotton off the ground, which loose cotton cannot be harvested by conventional cotton pickers which are adapted to pick cotton off the cotton plants, and which is expensive and difficult to pick up by hand.

Another object of this invention is to provide a cotton picking device which will conform to irregularities in the surface of the ground and impale the loose cotton lying thereon and elevate and discharge the impaled cotton.

A further object of this invention is to provide a cotton picking device, in accordance with the aforegoing objects, which will sweep the loose cotton on the ground below the rows of cotton plants into the path of movement of the picking device whereat it will be impaled and gathered by the device.

An important feature of this invention resides in the provision of a cotton harvesting device including a drum mounted for rotation about an axis parallel to the ground, and a plurality of crescent-shaped impaling plates swingably mounted on the periphery of the drum for movement in a plane transverse to the axis of the drum, which plates having a toothed convex edge for impaling or snagging engagement with the cotton on the ground, and which plates are of a length greater than the distance between the undersurface of the drum and the ground whereby a major portion of the convex edge contacts the ground as the drum is rotated.

Another feature of the invention resides in the provision of a cotton harvesting device including a rotating drum and a peripherally spaced crescent-shaped impaling plate swingably mounted on the drum, together with a reel rotatably mounted in overlying relation to the drum and a plurality of flexible stripping elements on the reel for removing the cotton from the cotton impaling plates as the drum and reel rotate in relatively opposite directions.

A further feature of this invention resides in the provision of a loose cotton picking device including a rotatable drum having a plurality of peripherally spaced cotton impaling elements swingably mounted thereon for picking loose cotton off the ground, a brush mounted on one side of the device for rotation about an upwardly inclined axis, and a plurality of radial arms on the brush engageable with the cotton plants for rotating the brush to sweep the loose cotton on the ground beneath the cotton plants into the path of movement of the impaling element as the picking device moves along the cotton rows.

These, together with various ancillary objects and features are attained by this device, a preferred embodiment of which is illustrated in the accompanying drawings, wherein:

Figure 2 is a side elevational view on a reduced scale of the cotton picking device;

Figure 3 is a front elevational view of the cotton picking device;

Figure 4 is a plan view on an enlarged scale of the picker drum with the picker plate mounted thereon;

Figure 5 is an enlarged elevational view of the picker drum with parts broken away and shown in section;

Figure 6 is an enlarged perspective elevational view of one of the crescent shaped picker plates.

Figure 1:
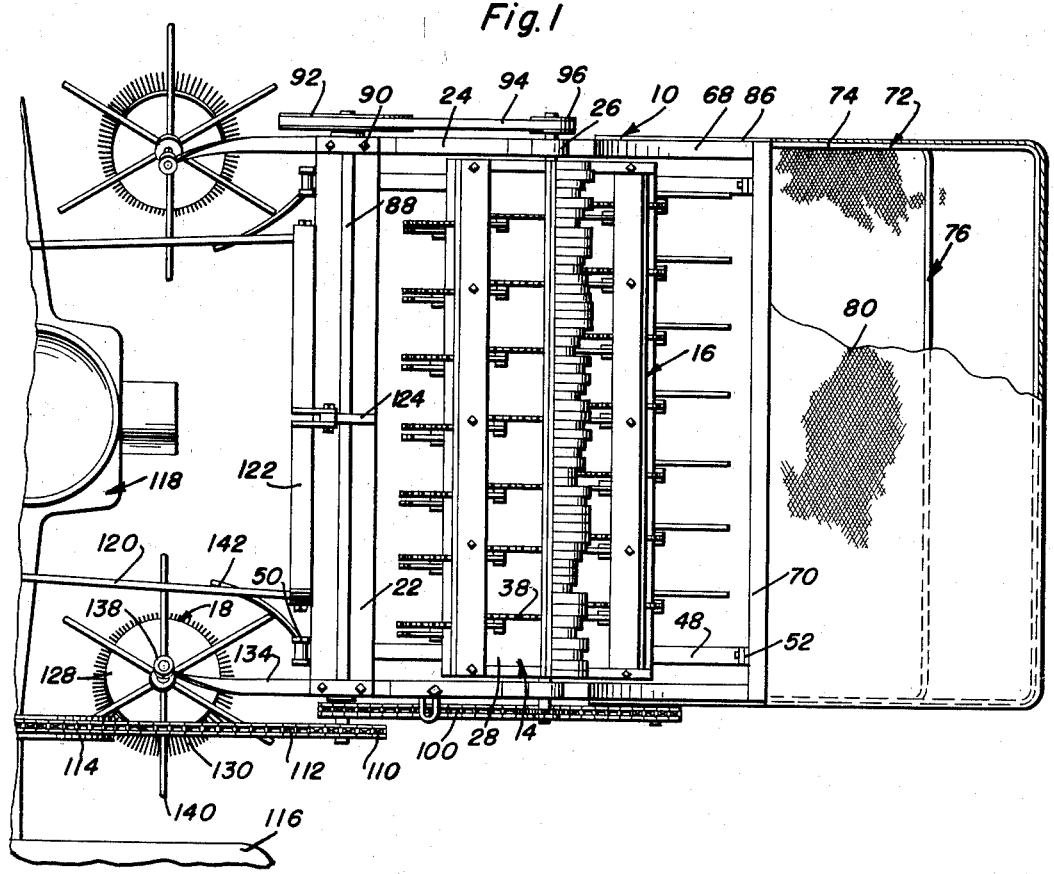
Figure 1 is a top plan view of the cotton picking device, parts being broken away and shown in section to illustrate details of construction.
Figure 7:
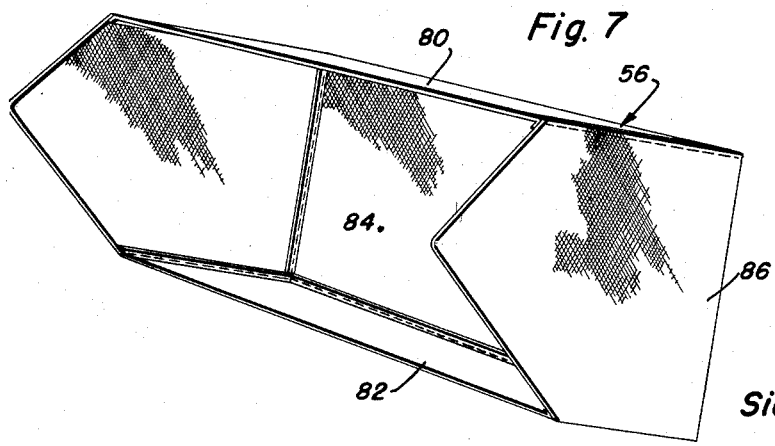
Figure 7 is a perspective elevational view of the cotton receptacle.

Reference is now made more specifically to the accompanying drawings, wherein there is illustrated a cotton picking device indicated generally by the numeral 10, and which device includes a supporting frame 12, a picker assembly 14, a stripper assembly 16, and a sweeping assembly 18. The support frame includes a pair of parallel angle iron side rails 20, a forward end rail 22 and a rear end rail (not shown) secured to opposite ends of the side rails in any desired manner. A pair of inverted substantially U-shaped stripper support brackets 24, each have the ends of the leg portions thereof secured to one of said side rails 20, as by welding, and aligned journals are secured to the web portions of said brackets, which journals rotatably receive the stripper assembly, to be described more fully hereinafter.

The picker assembly 14 includes a drum 28 having end plates 30 rigidly secured thereto, which plates may be peripherally fluted, as at 32, if desired. An axle 34 is rigidly secured to the end plates 30 for rotation with the drum, the ends of the axis 34 being rotatably received in journals 36 carried by the side rails 20. A plurality of crescent-shaped picker plates 38, having a toothed or spurred convex edge 40 and a concave edge 42 complementary to the periphery of the drum, are provided, and each has one end thereof pivotally mounted on the pins 44, each carried by one of the pairs of radially extending lugs 46 on the drum 28.

It is contemplated that the drum 28 be driven in a direction such that the undersurface thereof moves in the direction of movement of the support frame as the latter is towed over the ground, and that the leading ends of the picker plates be pivoted to the drums.

A pair of runners 48 each have the forward ends thereof secured as at 50 to the side rails 20, the rear ends of the runners being preferably vertically adjustable and secured, as by brackets 52, to the rear ends of the side rails. It is intended that the runners be adjusted so that the undersurface of the drum is spaced above the ground a distance greater than the width of the picker plates whereby the plates will not be pressed by the drum 28 into the ground, but will, instead, move relative to the drum variably in accordance with the irregularities in the surface of the ground. When moved in this manner, the loose cotton fibers lying on the ground will be impaled on the serrated or toothed edges of the picker plates 38. Thus, in effect, the plates 38 constitute impaling plates.

In the preferred form of the invention as shown in Figure 4, the picker plate mounting lugs 46 are positioned in a helical path around the periphery of the drum, the lugs being spaced so that the picker plates are in endwise overlapping relation. In this manner, the cotton which may be pushed aside by one picker plate will be moved into the path of an adjacent picker plate and gathered thereby.

The stripper assembly 16 includes a reel 54 and a receptacle 56. The reel consists of a pair of spiders 58 secured to a shaft 60 and which shaft is rotatably mounted in journals 26 carried by brackets 24. A pair of overlapping strips 62 are secured to each other and to one of the legs of each of said spiders 58, and a plurality of flexible elements 64 are clamped between the strips 62 for the purpose of removing or stripping the cotton from the picker plates 38 and depositing the same in the receptacle 56, as the reel rotates.

A pair of uprights 66 are secured to the rear ends of the side rails 20 and suitably braced to the brackets 24 by arms 68, the uprights being braced relative to each other by the connecting member 70. A U-shaped receptacle support frame 72 has the ends of the legs 74 thereof secured to the upper ends of the uprights, and a similarly shaped bracing yoke 76 has the ends of the legs 78 thereof secured adjacent the lower ends of the uprights 66, the yoke being secured to the frame 72 intermediate the ends of the legs 74 thereof to support the frame.

The receptacle 56 includes upper and lower walls 80 and 82, a rear wall 84, and end walls 86. The upper wall 80 rests upon and completely covers the U-shaped frame 72, while the end walls 86 overlie the sides of the uprights 66, the brace arm 68 and the adjacent legs of the brackets 24, to guide the cotton into the bottom of the receptacle.

A driven shaft 88 is rotatably mounted on journals 90 carried by the side rails 20, forwardly of the drum. A pulley 92, which is secured to one end of the shaft 88, is drivingly connected by a belt 94 to an aligned pulley 96 on the reel support shaft 60, and the sprocket 98 on the other end of the shaft 88 is drivingly connected by a chain 100 to a sprocket gear 102 on the drum shaft 34 and to the idler sprocket 106. The idler sprocket is preferably vertically adjustably mounted, as by bracket 108, on the side rail 20 to permit adjustment of the tension on the chain. The shaft 88 is driven by the sprocket 110 carried thereby, which sprocket is drivingly connected by the chain 112 to the driving sprocket 114. It is contemplated that the sprocket 114 be operatively connected to one of the wheels such as 116 of the prime mover 118 which tows the harvesting device whereby the drum will be rotated at a rate proportionate to the speed of advance of the harvester and in a clockwise direction as viewed in Figure 2. The reel 54 will be similarly driven, but in a relatively opposite direction to the direction of rotation of the drum 28, whereby the flexible elements 64 on the reel will strip the cotton from the picker plate and move the same into the receptacle 56.

The harvesting device is coupled to the prime mover 118 by draw bars 120 which are vertically pivotally attached to the forward end of the support frame 12. In order to facilitate transportation of the harvesting device, to and from the place of use, there is provided a pair of upwardly extending relatively converging bars 122 which are secured to each other and to the brace member 124, at the upper ends, and which have their lower ends suitably secured to the frame 12. The upper ends of the bars may be connected to the implement lift bars (not shown) on the prime mover 118, whereby the entire harvesting device may be elevated above the ground for transportation or to facilitate turning.

As it is intended to use the harvester between rows of cotton plants, indicated at 126 in Figure 3, there is provided a sweeping assembly 18 for brushing the loose cotton from beneath the plant, into the path of movement of the picker plates 38. The sweeping assembly includes a flat brush head 128 having bristles 130 extending from one face thereof and a stub shaft 132 secured to and extending outwardly of the other face of the brush head. A pair of forwardly extending arms 134 are secured to the side rails 20 and have journals 136 formed on the outer ends thereof. The shafts 132 extend through the journals and are retained in position by collars 138 carried by the shafts. The arms 134 are longitudinally twisted so that the brush bristles 134 will closely follow the contour of the "hill" adjacent the plant rows 126, and, in order to compensate for irregularities in the ground, it is contemplated that the brushes be made vertically movable as by providing arms 134 which are sufficiently resilient to permit such movement. Obviously, the shafts 132 should be so inclined to the vertical that the portions of the bristles 130 traveling toward the plants will be spaced above the ground, while the bristles 130 travelling toward the machine and away from the cotton plant will be sufficiently close to the ground to contact the cotton lying thereon.

Radially extending fingers 140 are secured to the brush head 128 and form a spider which is adapted to engage the plants 126 as the harvesting device is moved parallel to the rows, thereby rotating the brushes and causing the aforementioned sweeping of the loose cotton into the path of movement of the picker plates 38. Arcuate deflecting arms 142 are secured to the forward portions of the runners 48 to guide the plants 146 out of the bath of the runners.

From the aforegoing, it will be seen that movement of the harvesting device along the rows of plants 126 will cause the brushes to sweep the loose cotton beneath the plants into the path of movement of the picker plates 38. The cotton is then picked up by the picker plates as the drum 28 rotates after which the cotton is stripped from the plates and thrown into the receptacle 56 by the stripper assembly 16.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A cotton harvester for harvesting fallen cotton comprising a support frame adapted to be moved over the ground, a horizontally disposed drum rotatably journaled on said frame transverse the direction of movement thereof, means operatively connected to said drum and said support frame for rotating said drum, a plurality of crescent-shaped cotton impaling plates, each plate being narrower than it is deep, means for movably mounting each of said plates on said drum perpendicular to the longitudinal axis thereof, said mounting means including means swingably attaching said plates to said drum with the concave edge of said plates registering with said drum, said plates each having a serrated, ground engaging edge for impaling loose cotton on the ground.

2. The combination of claim 1 wherein said drum rotating means drives said drum in a direction to cause the undersurface of said drum to move in the same direction as the movement of said frame.

3. In a harvesting device, an elongated drum, means for rotatably supporting said drum in parallel spaced relation to the ground, a plurality of crescent-shaped picker plates, said plates each having a concave edge complementary to said drum and a toothed convex edge, means engaging said plates swingably attaching said plates to the periphery of said drum for movement in a plane transverse the axis of said drum, and means secured to said drum and said supporting means for rotating said drum, said plates being mounted in a helical pattern about the periphery of said drum in endwise overlapping relation.

4. In a cotton harvester for recovering loose cotton bolls from the ground, a mobile frame, a horizontally disposed drum rotatably journaled on said frame, means for rotating the drum, a plurality of crescent-shaped picker plates having means on the convex edge thereof for impaling the cotton, means attaching each of said plates to the peripheral surface of said drum for swinging movement about an axis parallel to the axis of rotation of said drum, said means consisting for each plate, a bracket on said drum, and a pivot pin at one end of one of said plates and disposed in said bracket.

5. In a cotton harvester for recovering loose cotton bolls from the ground, a frame, a drum, means mounting said drum for rotation in said frame, a plurality of crescent-shaped picker plates, means on the convex edge of each plate for impaling the cotton bolls, each plate being smaller in cross-section and measured in a direction parallel to the axis of rotation of said drum than it is in depth measured in a direction radial to the axis of rotation of said drum and at approximately the center of the picker plates, means attaching each of said plates to the peripheral surface of said drum for swinging movement about a pivot axis parallel to the axis of rotation of said drum and including a plurality of brackets mounted in a helical pattern about the periphery of said drum, so that said plates mounted in said brackets are arranged in a helical pattern about the periphery of said drum.

6. The cotton harvester of claim 5 wherein said picker plates have end portions overlapping in endwise relationship the adjacent ends of the next picker plates.

References Cited in the file of this patent

UNITED STATES PATENTS

| | | |
|---|---|---|
| 575,860 | Smith | Jan. 26, 1897 |
| 1,439,266 | Shaw | Dec. 19, 1922 |
| 1,629,678 | Burrow | May 24, 1927 |
| 1,714,617 | Parker | May 28, 1929 |
| 1,751,389 | Bledsoe, Jr. | Mar. 18, 1930 |
| 1,793,426 | Kent | Feb. 17, 1931 |
| 1,828,534 | Johnston | Oct. 20, 1931 |
| 2,528,102 | Willis | Oct. 31, 1950 |
| 2,564,319 | Beck | Aug. 14, 1951 |
| 2,648,942 | Grant et al. | Aug. 18, 1953 |